(12) United States Patent
Snyder et al.

(10) Patent No.: US 8,070,128 B2
(45) Date of Patent: Dec. 6, 2011

(54) MANUAL OR AUTOMATIC ACTUATION SYSTEM

(75) Inventors: Jonathan W. Snyder, Wheaton, IL (US); John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 1104 days.

(21) Appl. No.: 11/863,188

(22) Filed: Sep. 27, 2007

(65) Prior Publication Data

US 2008/0078969 A1  Apr. 3, 2008

Related U.S. Application Data

(60) Provisional application No. 60/848,291, filed on Sep. 29, 2006.

(51) Int. Cl.
*F16K 31/05* (2006.01)

(52) U.S. Cl. ............. 251/129.03; 251/40; 251/129.04; 251/129.11; 251/252; 4/249

(58) Field of Classification Search .......... 251/40, 251/129.03, 315.1, 294, 129.04, 252, 253, 251/257, 254, 229, 248, 129.11, 256; 74/567, 74/839; 4/249; *F16K 31/05*
See application file for complete search history.

(56) References Cited

U.S. PATENT DOCUMENTS

| | | | |
|---|---|---|---|
| 1,048,825 A * | 12/1912 | Griffiths | 251/229 |
| 2,552,625 A * | 5/1951 | Filliung, Jr. | 137/624.12 |
| 2,612,179 A * | 9/1952 | Filliung | 137/360 |
| 2,633,141 A * | 3/1953 | Russell | 137/49 |
| 3,682,438 A * | 8/1972 | Klimek | 251/256 |
| 3,829,059 A * | 8/1974 | Rupert | 251/26 |
| 4,343,456 A * | 8/1982 | Zitzloff | 251/255 |
| 4,934,408 A * | 6/1990 | Christopherson | 137/625.46 |
| 5,068,773 A | 11/1991 | Toth | |
| 5,103,857 A * | 4/1992 | Kuhn et al. | 137/315.13 |
| 5,431,181 A * | 7/1995 | Saadi et al. | 137/15.11 |
| 5,680,879 A * | 10/1997 | Sheih et al. | 137/240 |
| 5,699,994 A * | 12/1997 | Wu | 251/129.03 |
| 6,499,152 B2 | 12/2002 | Johnson | |
| 6,560,790 B2 | 5/2003 | Saar et al. | |
| 6,643,853 B2 * | 11/2003 | Wilson et al. | 4/249 |
| 6,978,490 B2 * | 12/2005 | Wilson | 4/249 |
| 7,028,975 B2 | 4/2006 | Lee et al. | |
| 7,156,187 B1 * | 1/2007 | Townsan | 173/1 |
| 7,367,541 B2 * | 5/2008 | Muderlak et al. | 251/129.04 |
| 7,510,166 B2 * | 3/2009 | Maercovich et al. | 251/129.03 |
| 7,549,436 B2 * | 6/2009 | Parsons et al. | 137/15.18 |
| 2003/0019022 A1 | 1/2003 | Wilson et al. | |
| 2004/0040079 A1 | 3/2004 | Snyder | |
| 2004/0194824 A1 | 10/2004 | Guler et al. | |
| 2008/0087856 A1 * | 4/2008 | Wilson et al. | 251/129.03 |

FOREIGN PATENT DOCUMENTS

TW  M284696 U  1/2006

* cited by examiner

*Primary Examiner* — John Rivell
*Assistant Examiner* — Matthew W Jellett
(74) *Attorney, Agent, or Firm* — Foley & Lardner LLP

(57) ABSTRACT

A dual function actuator for a flush valve. The actuator contains a sensor for controlling a motor, which in response to a stimulus will move a plunger which actuates the flush valve. The actuator is also configured to allow for manual actuation of the flush valve by tilting a distal portion of the actuator in relation to the remaining portion of the actuator and flush valve, which moves the plunger actuating the flush valve.

20 Claims, 13 Drawing Sheets

MANUAL OR AUTOMATIC ACTUATION SYSTEM

CROSS-REFERENCE TO RELATED PATENT APPLICATION

This application claims priority from U.S. Provisional Patent Application No. 60/848,291, filed Sep. 29, 2006, herein incorporated by reference in its entirety.

FIELD OF THE INVENTION

The present invention relates generally to the field of flush valves. In particular, the present invention relates to systems and method for actuating a flush valve manually or automatically.

BACKGROUND OF THE INVENTION

The use of automatic flush valves had become commonplace in most commercial restrooms. However, there is often a desire to allow for manual actuation as well as for automatic actuation. Such "multiple function" devices must provide the ease of operation of a traditional manual flush while still providing the advantages of an automatic flush.

Current devices for actuation of a flush valve typically are either automatic or manual. Those devices that provide for both types of actuation require modification to a standard flush valve. In addition, such current devices often require a user to perform a unique manner of actuation, which in the commercial setting can lead to confusion and non-use.

SUMMARY OF THE INVENTION

One embodiment of the invention relates to automatic or manual activation of a flush valve. The present application describes a device which can automatically activate a flush valve or which can be manually activated in an intuitive way to actuate the flush valve.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The accompanying drawings, which are incorporated in and constitute a part of the specification, illustrate embodiments of the invention and together with the description, serve to explain the principles of various embodiments of the invention.

DETAILED DESCRIPTION OF THE PREFERRED EMBODIMENTS

Figure 1:
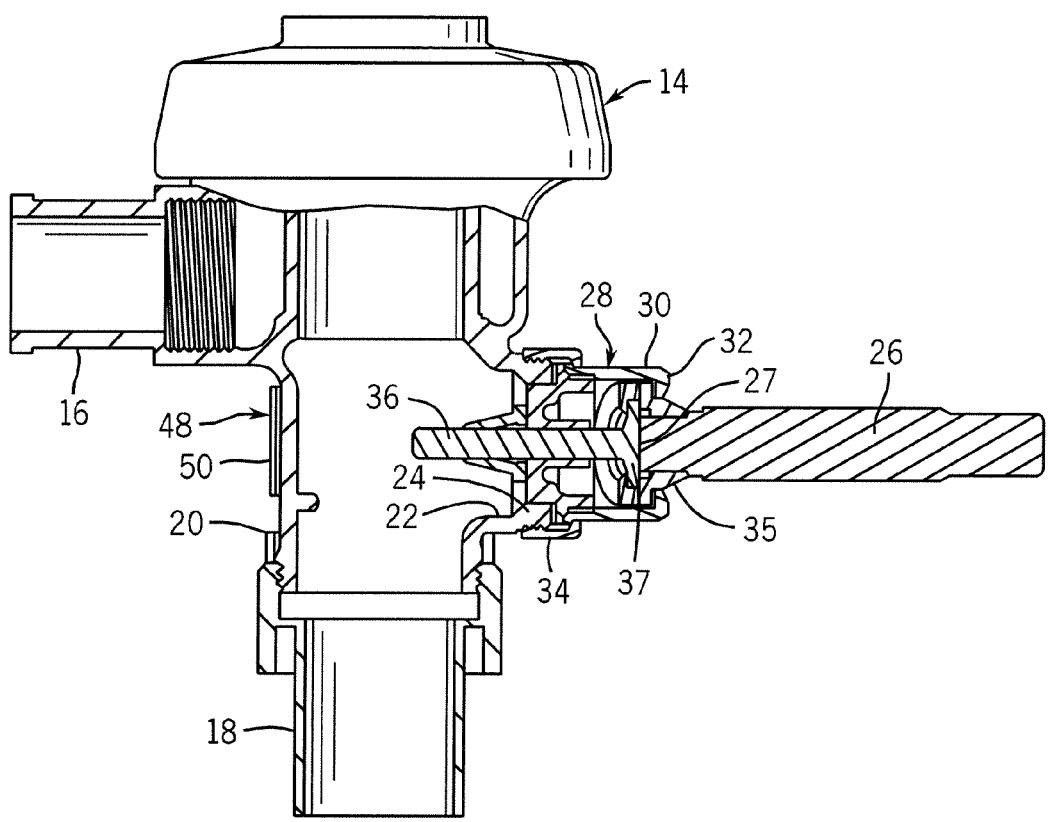
FIG. 1 illustrates a typical prior art flush system.

FIG. 1 illustrates a flush valve 12 of the prior art. The flush valve 12 has a flush valve body 14 which includes a water inlet 16, a water outlet 20 and a vacuum breaker 18 beneath the water outlet 20. A handle opening 22 in the water outlet 20 is surrounded by a laterally-extending, annular boss 24, typically externally threaded. Inside the flush valve body 14 there is either a movable diaphragm or a piston (not shown) that will control the flow of water between the water inlet 16 and the water outlet 20 in the conventional manner. The diaphragm or piston has associated with it the usual relief valve (not shown) whose depending stem extends away from the diaphragm to a point opposite the handle opening.

In traditional flush systems, a manual actuation handle 26 is mounted to the boss 24 by a handle mounting member. In this case the handle mounting member includes a handle socket 28. The handle socket 28 has a generally cylindrical cup 30 and an end face formed by a flange 32. A lip on the opposite end of the cup 30 is trapped by a coupling nut 34. The coupling nut 34 is threaded to the boss 24. The manual actuation handle 26 is pivotally movable about a three dimensional pivot when the manual actuation handle 26 is used to cause operation of the flush valve 12. A shank 35 inside the handle socket 28 captures the inner end of the manual actuation handle 26. A plunger 36 joins the shank 35 and extends into the flush valve body 14 where it can act on a relief valve stem (not shown). Tilting of the manual actuation handle 26 off of the horizontal axis causes movement a handle face plate 27 against the plunger face plate 37 such that the plunger 36 trips the relief valve and begins a flushing cycle. Thus, the flush valve 12 of FIG. 1 provides a user with the familiar upward or downward actuation of the flush system through use of tilting the manual actuation handle 26.

Figure 2:
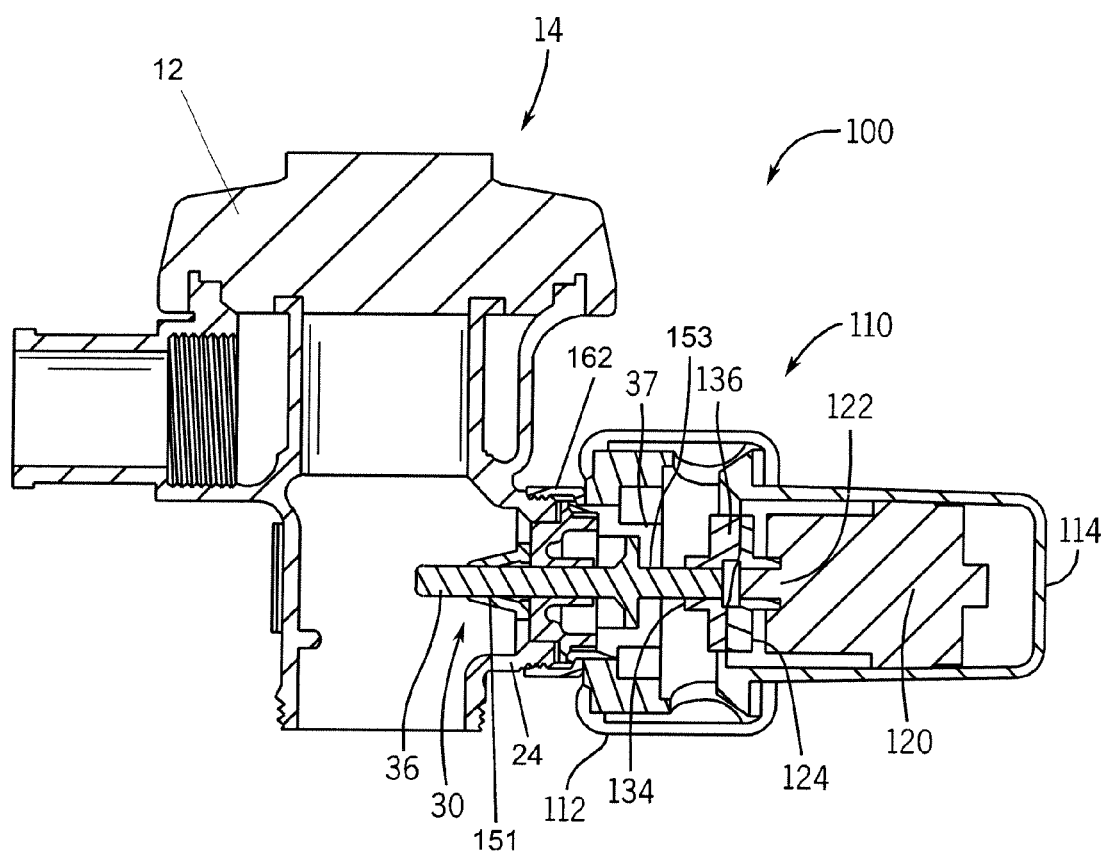
FIG. 2 is a side cross sectional view along the major axis of a device in accordance with the principles of the present invention engaged with a flush valve.
Figure 3:
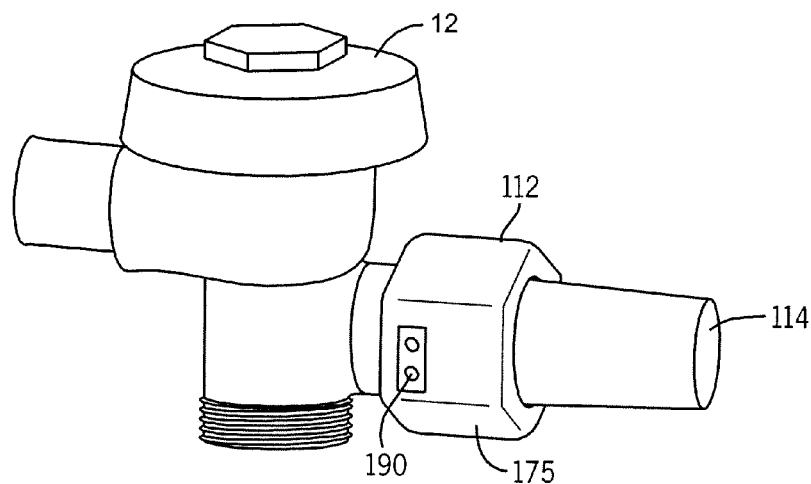
FIG. 3 is a side view of the device of FIG. 2, assembled and affixed to a flush valve assembly.

The present invention relates to a flush system, such as, but not limited to, those using traditional flush valves as shown in FIG. 1, that is actuable both manually, i.e. with user intervention via a manual actuation handle 26, and automatically, i.e. without user intervention. As best shown in FIG. 2, at least a portion of an actuation device 100 of the present invention is positioned where a traditional handle would be placed on a manually activated flush valve and allows a user to manually actuate the flush valve in the manner of a traditional manually operated flush system.

Referring to FIGS. 1 and 2 the general structure of an actuation device 100 comprises a housing 110 that is engagable with the flush valve body 14. In one embodiment illustrated in FIG. 2, the housing 110 is attached to the boss 24 of the flush valve body 14 rather than the traditional manual actuation handle 26 of FIG. 1. The housing 110 includes a front housing 112 and a rear housing 114. When positioned on a flush valve 12, the front housing 112 is proximate the flush valve body 14 and the rear housing 114 is distal the flush valve body 14. The components, described below, that provide the functionality and structure to the actuation device 100 are generally disposed within the housing 110.

Turning first to the components generally disposed in the front housing 112, the plunger 36 is retained within front housing 112 extending through the boss 24 into the flush valve body 14 in communication with the relief valve stem (not shown). The plunger 36 includes a first end 132 proximate the relief valve stem (not shown) and a second end 133, distal the relief valve stem and adjacent the rear housing 114, and further having the plunger face plate 37 disposed between the first and second ends 132, 133. The first end 132 extends from the front housing 112 into the flush valve 12 through the boss 24 when the actuation device 100 is attached to the flush valve 12. The second end 133 is positioned opposite the relief valve, proximate the motor 120 (discussed below). Thus plunger 36 is partially disposed in the front housing 112. The plunger 36 further includes a plunger cam 136 which is positioned operatively at the second end 133 for engaging the motor 120.

Figure 4:
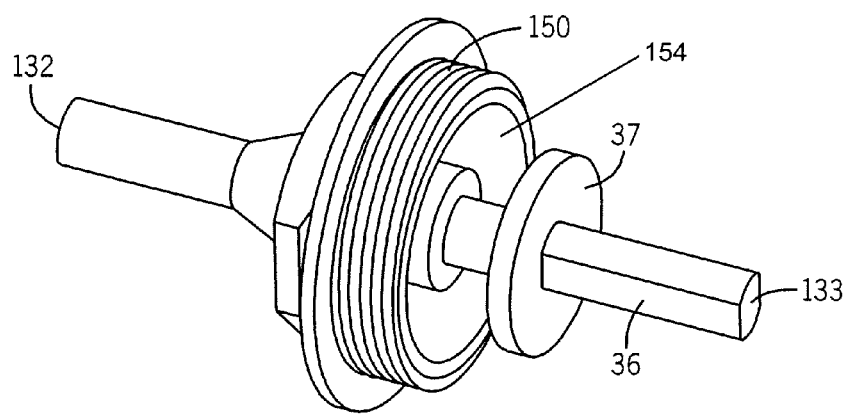
FIG. 4 is a perspective view of a plunger and bushing.
Figure 5:
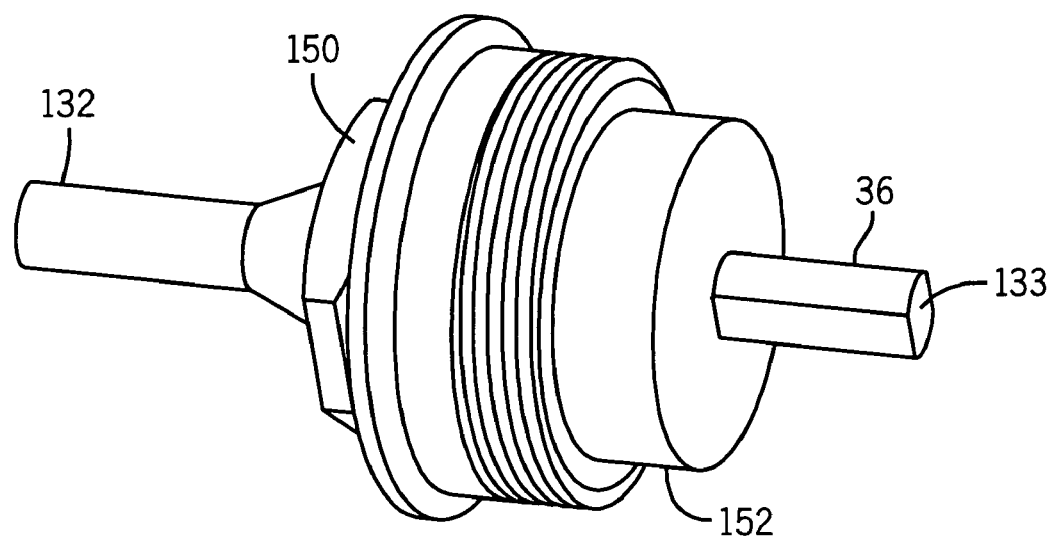
FIG. 5 is a perspective view of a plunger and a plunger spring housing.
Figure 6:
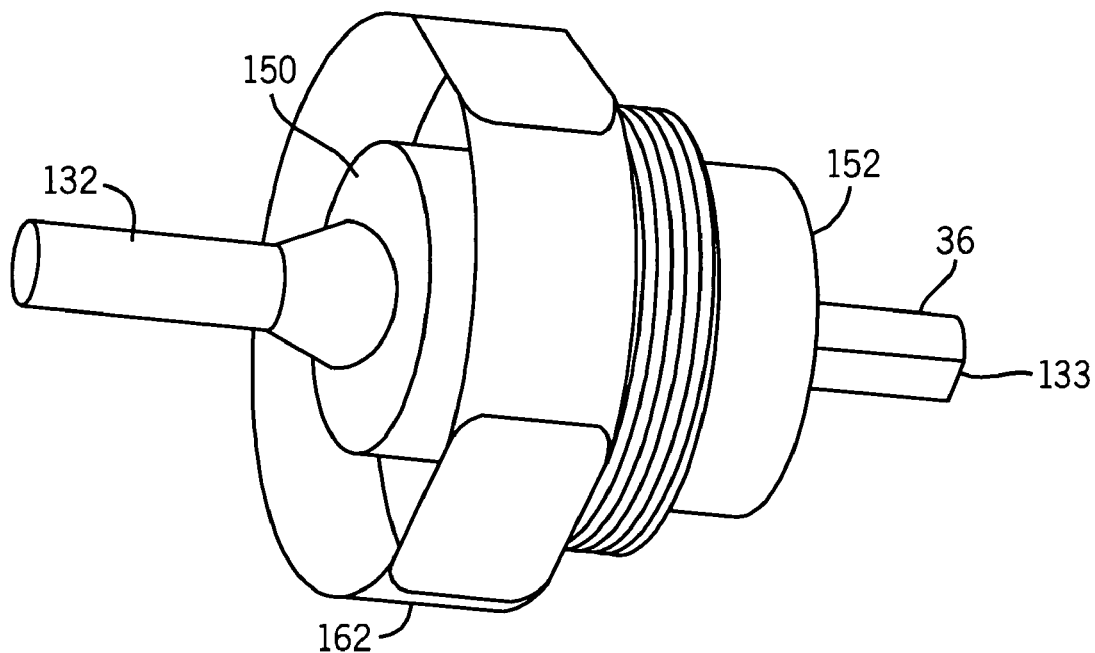
FIG. 6 is a perspective view of the plunger and the plunger housing of FIG. 5 coupled with a coupling nut.

FIGS. 4-6 best illustrate the plunger bushing 150, which is disposed within the front housing 112. The plunger bushing 150 includes a passage therethrough (not shown) that allows the plunger 36 to slide relative to the plunger bushing 150. The plunger bushing 150 is disposed within the boss 24, as seen in FIG. 2, with the bushing being exposed to the interior of the flush valve 12.

The actuation device 100 further comprises a plunger chamber housing 152, illustrated in FIGS. 5-6. The plunger chamber housing 152 includes an aperture (not shown) therethrough that allows the plunger 36 to slide relative to the plunger chamber housing 152. As shown in FIG. 5, a plunger chamber housing 152 is engagable with the plunger bushing 150, for example threadingly engagable, to form a plunger face plate chamber 154. The plunger face plate 37 is disposed within the plunger face plate chamber 154. The bushing aperture 151 and the plunger spring housing aperture 153 are sized small enough to prevent the plunger face plate 37 of the plunger 36 from passing through the respective apertures. Thus, the plunger face plate 37 is disposed within the plunger face plate chamber 154 and the plunger 36 is limited in its degree of movement along axis A-A by the distance the plunger face plate 37 can move in the plunger face plate chamber 154.

A plunger spring (not shown) is disposed within the plunger face plate chamber 154 (FIG. 16) and is positioned between the handle face plate 27 and the plunger bushing 150. Thus the plunger spring serves to bias the plunger 36 towards the plunger face plate chamber 154 and away from the plunger bushing 150 (i.e. away from engaging the relief stem tripping the flush valve 12). The bias against the plunger spring retains the plunger 36 in its most distal position along its major axis in relation to the flush valve body 14, i.e. in position where the plunger 36 is not engaging the stem of the flush valve 12. In one embodiment, the plunger 36 has between about 0.25-0.50 (preferably 0.25) inches of travel along its longitudinal axis A-A.

Figure 16:
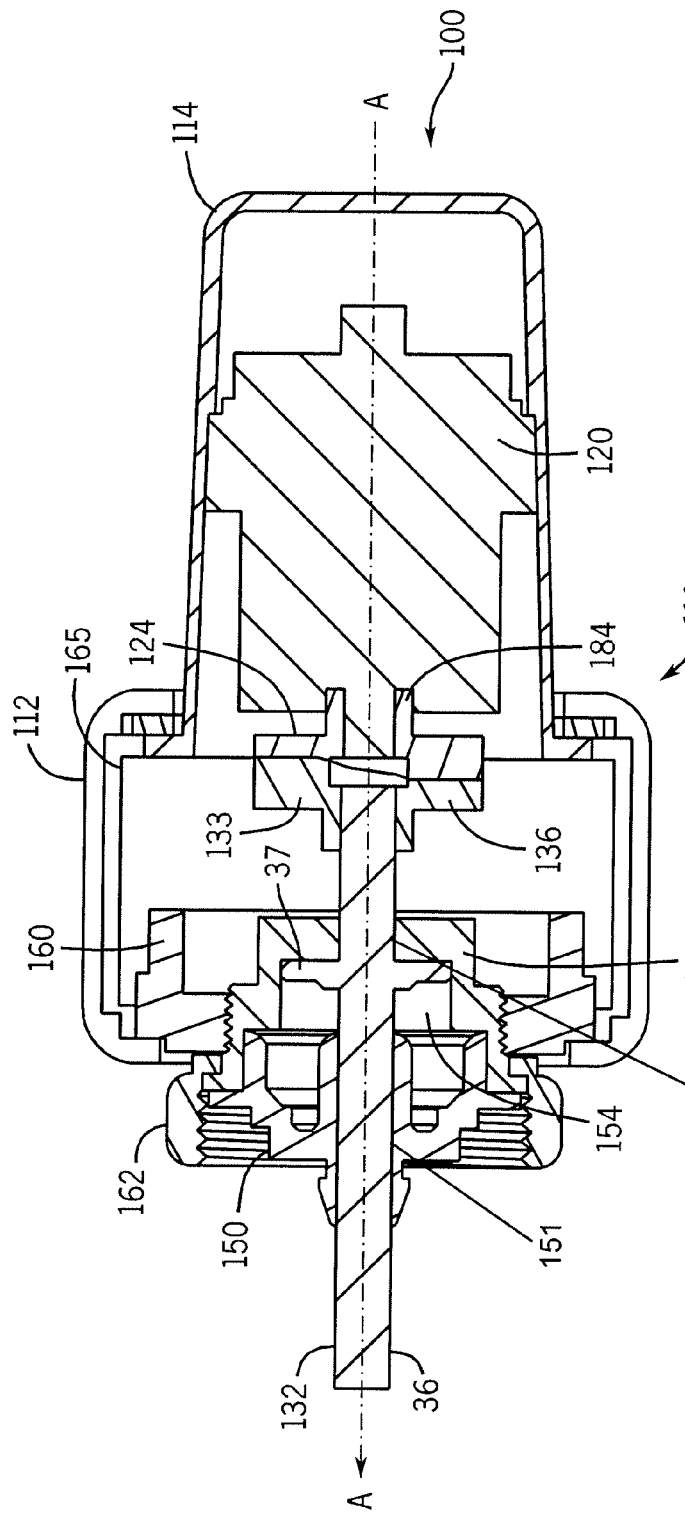
FIG. 16 is a cross sectional view along the major axis illustrating manual activation of a flush valve.

In one embodiment, the plunger 36 is shaped such that it is not freely rotatable about its major (longitudinal) axis although it is slidable along that axis. For example, the plunger 36 may have a substantially rectangular cross section (FIG. 16). Thus, the plunger 36 and the plunger cam 136 are not rotatable in relation to the housing 110, such as by having a rectangular portion disposed within a rectangular aperture in the plunger bushing 150 or the plunger chamber housing 152. Engagement of the plunger cam 136 results in lateral movement of the plunger 36 along its longitudinal axis A-A such that the plunger 36 is engaged and also slides along axis A-A.

Figure 7:
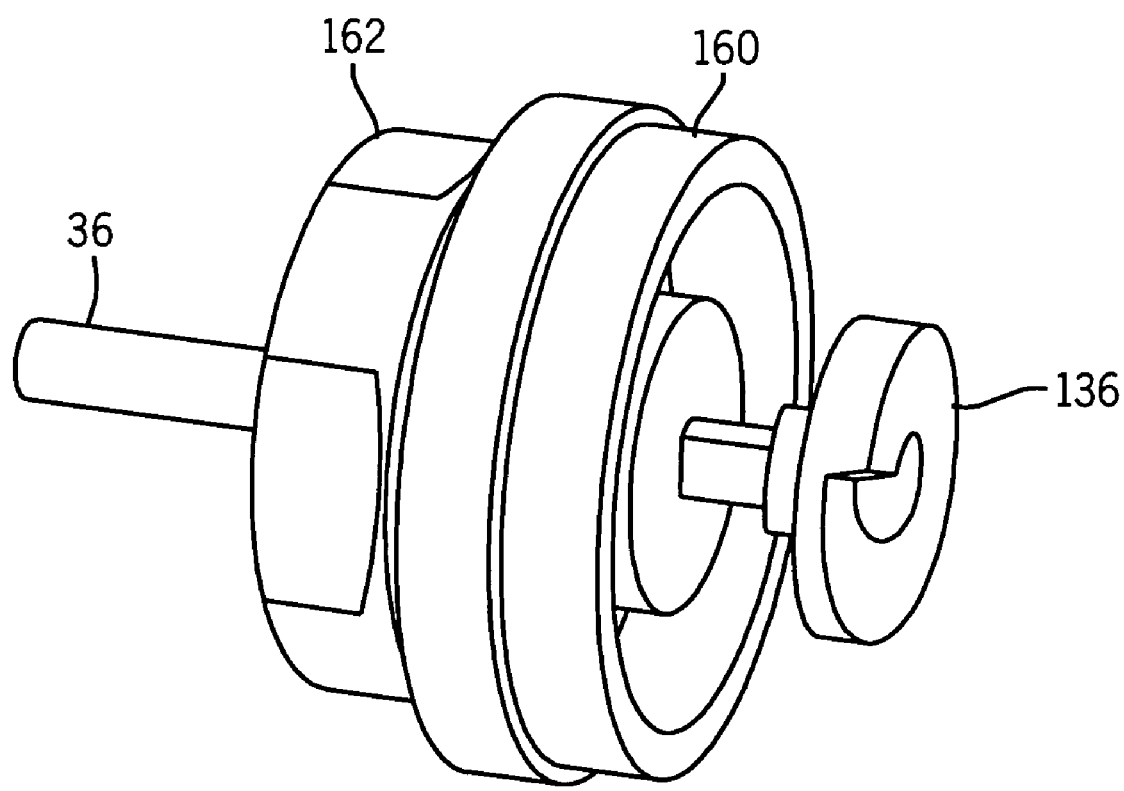
FIG. 7 is a perspective view of a plunger cam positioned on the plunger of FIG. 6

In one embodiment, illustrated in FIG. 6, a coupling nut 162 is provided for placement about the plunger chamber housing 152 such that the plunger chamber housing 152 (and the entire plunger 36/plunger bushing 150/housing 152 device) is rotatable with respect to the coupling ring 160. As shown in FIG. 7, a coupling nut 162 may be provided for engaging the boss 24, such as by threads, to secure the housing to the flush valve 12.

FIG. 7 illustrates an embodiment having a coupling ring 160 for assisting in coupling the above described assembly of the coupling nut 162, plunger chamber housing 152, and plunger bushing 150 with the mounting frame 164, describe below. Also illustrated in FIG. 7 is the position of the plunger cam 136 at the second end 133 of the plunger 36.

Figure 8A:
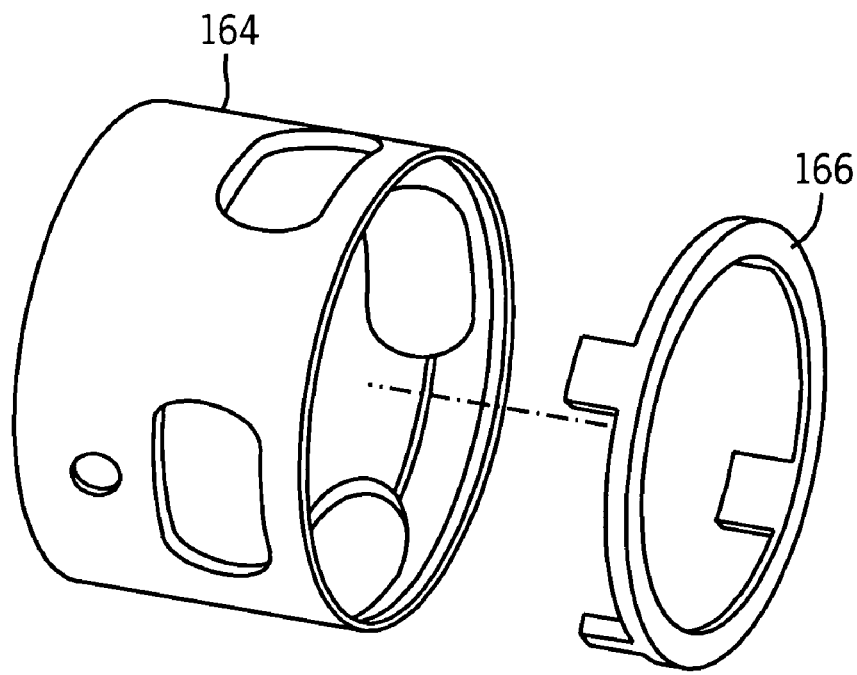
FIG. 8A is a perspective view of a mounting frame and an unattached mounting frame flange.
Figure 8B:
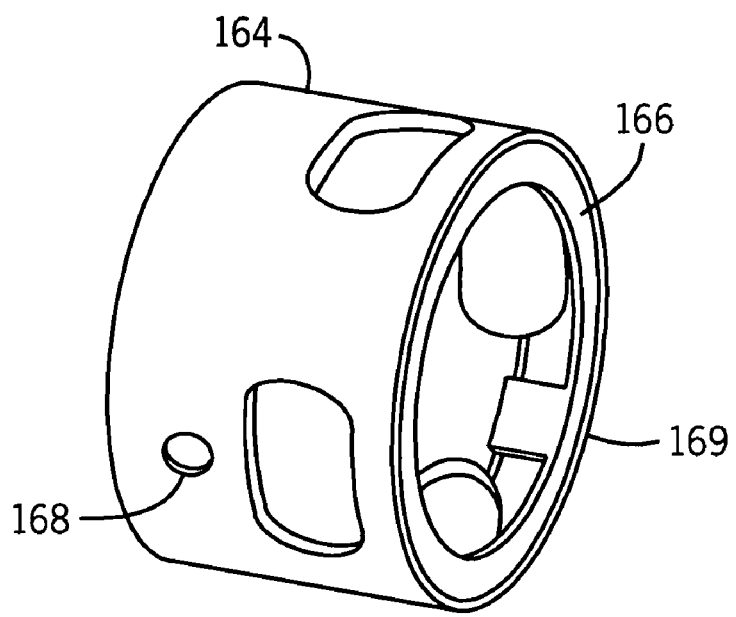
FIG. 8B illustrates the components of FIG. 8B attached.
Figure 10A:
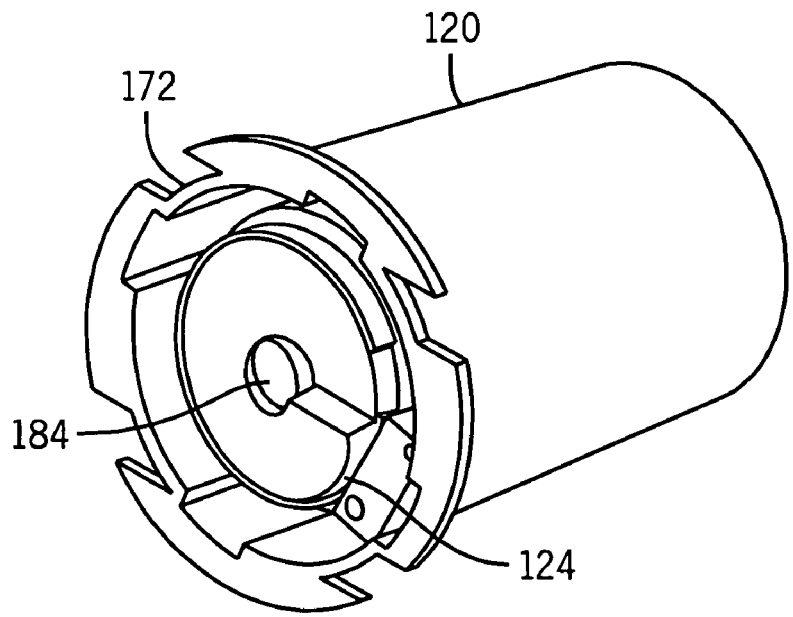
FIG. 10A is a perspective view of the drive housing of FIG. 9B inserted into a handle housing.
Figure 10B:
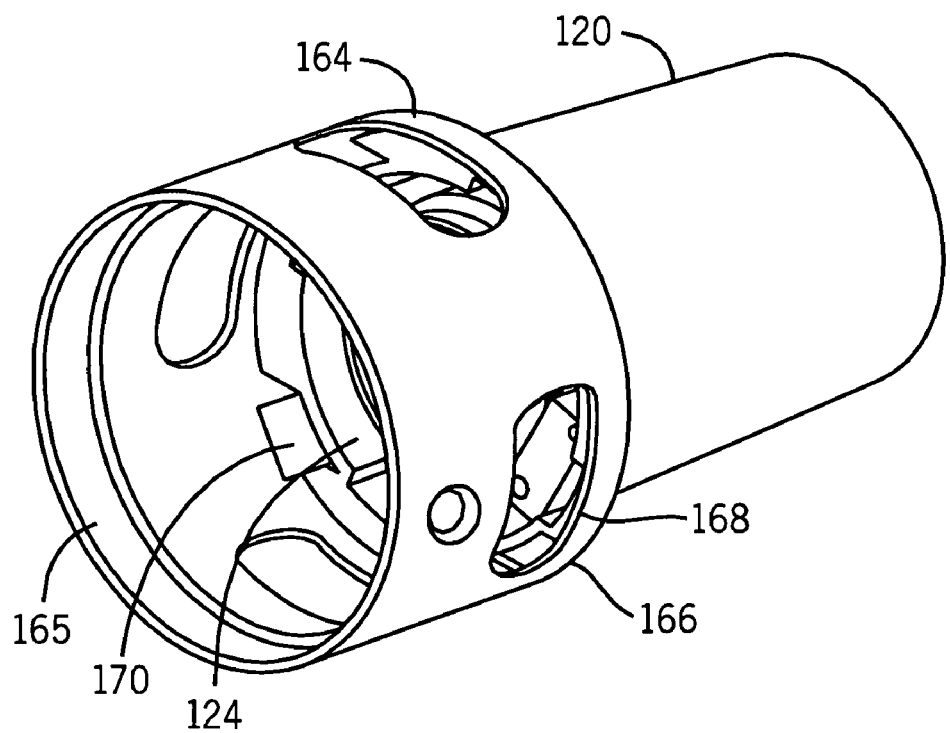
FIG. 10B is a perspective view of a of the structure shown in FIG. 9B attached to a mounting frame.

Turning the components in the rear housing 114, in one embodiment, illustrated in FIGS. 8A and 8B, a mounting frame 164 and a flange 166 are provided, connecting the motor 120 with the coupling ring 160. In an exemplary embodiment, the mounting frame 164 and the flange 166 are separate components engageable with each other, such as by brazing. The mounting frame 164 is adapted to receive at a first (front) end 168, the coupling ring 160, such that the plunger 36 is securable to the mounting frame 168. A second (rear) end 169 is adapted to receive the flange 166. The flange 166 is engageable with the motor 120 to attach the motor 120 to the mounting frame 164. In an exemplary embodiment illustrated in FIGS. 10A and 10B, the flange 166 includes tabs 170 for engaging slots 172 on the motor 120, the interaction of the tabs 170 and slots 172 prevents rotation of the motor 120 relative to the mounting frame 168. Drive cam 124 and the plunger cam 136 are disposed within the mounting frame 168. The mounting frame 164 is engageable with the coupling ring. In an exemplary embodiment, the mounting frame 164 includes threaded holes through which screws are engagable with the coupling ring.

Figure 11:
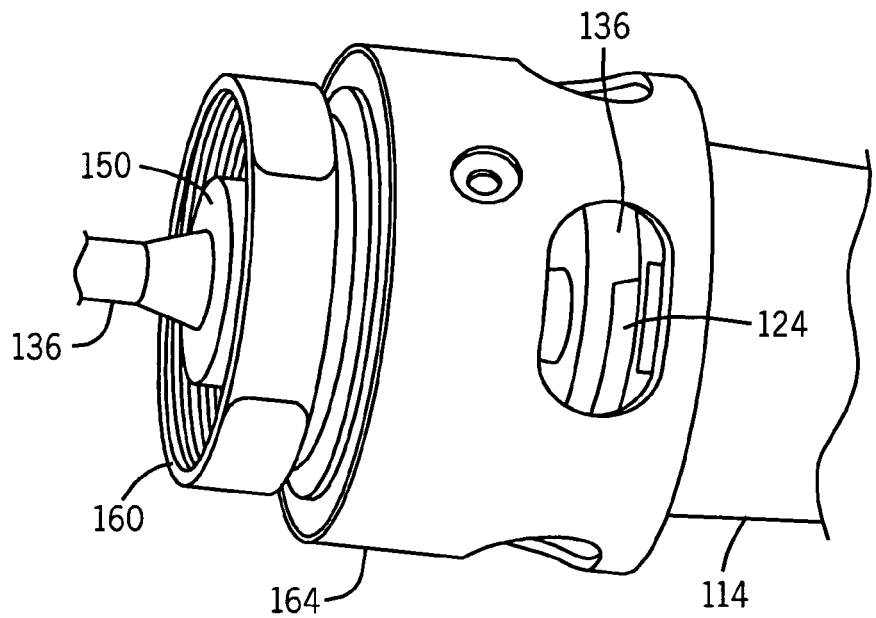
FIG. 11 is a perspective view of a the interaction between a plunger cam and drive cam.

As seen in FIG. 11, the drive cam 124 and the plunger cam 136 have complementary cam faces, i.e. the thicknesses of the plunger cam 136 and the drive cam 124 vary along their circumference. Rotation of the drive cam 124 (via the motor 120) relative to the rotationally fixed plunger cam 136 results in the plunger 36 sliding along its axis as the faces of the cams 124 and 136 interact. Also illustrated best in FIG. 11 is the interaction of the plunger bushing 150, plunger chamber housing 152, and coupling ring 160 (not shown in FIG. 11, but disposed with the mounting frame 164) with the mounting frame 164 and rear housing 114 components. The coupling ring 160 and the mounting frame 164 are attached, such as by screws (not shown), to secure the components in the front housing 112 to the components in the rear housing 114.

Figure 12A:
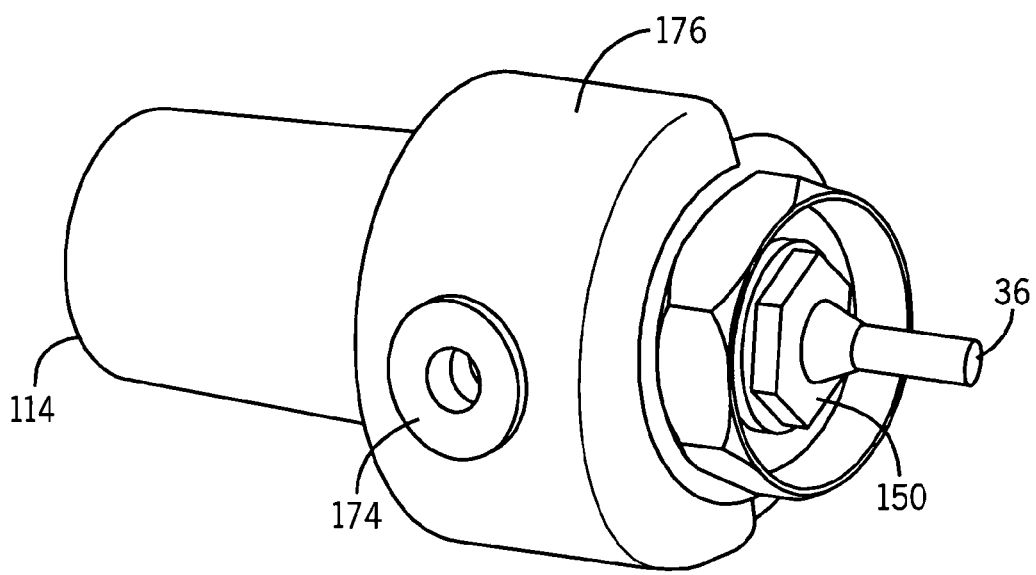
FIG. 12A is a back perspective view of a cover.
Figure 12B:
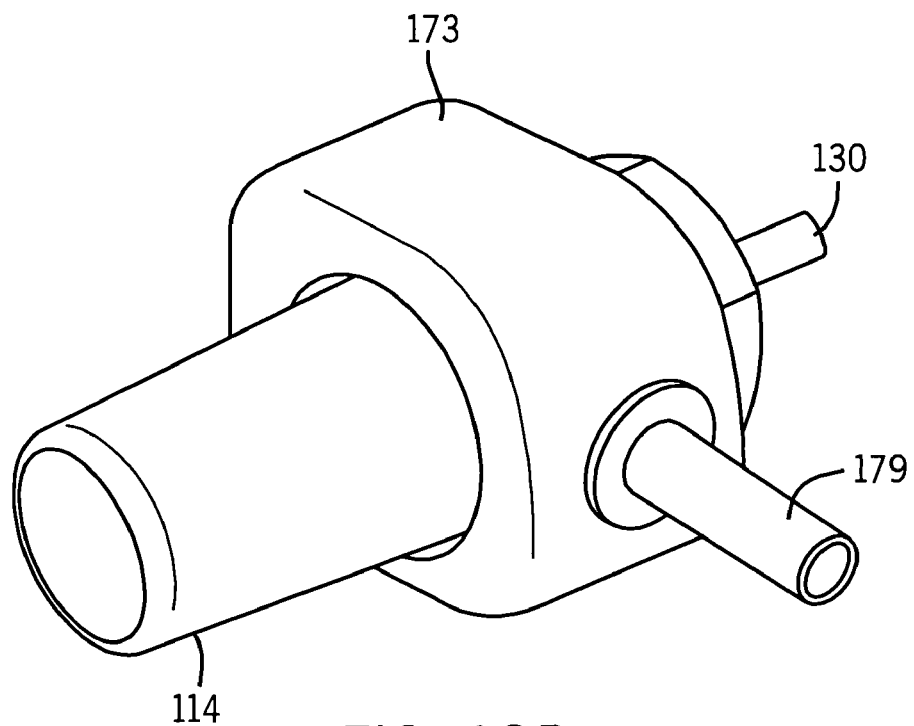
FIG. 12B is a front perspective view of a perspective view of the device of FIG. 12A.
Figure 13:
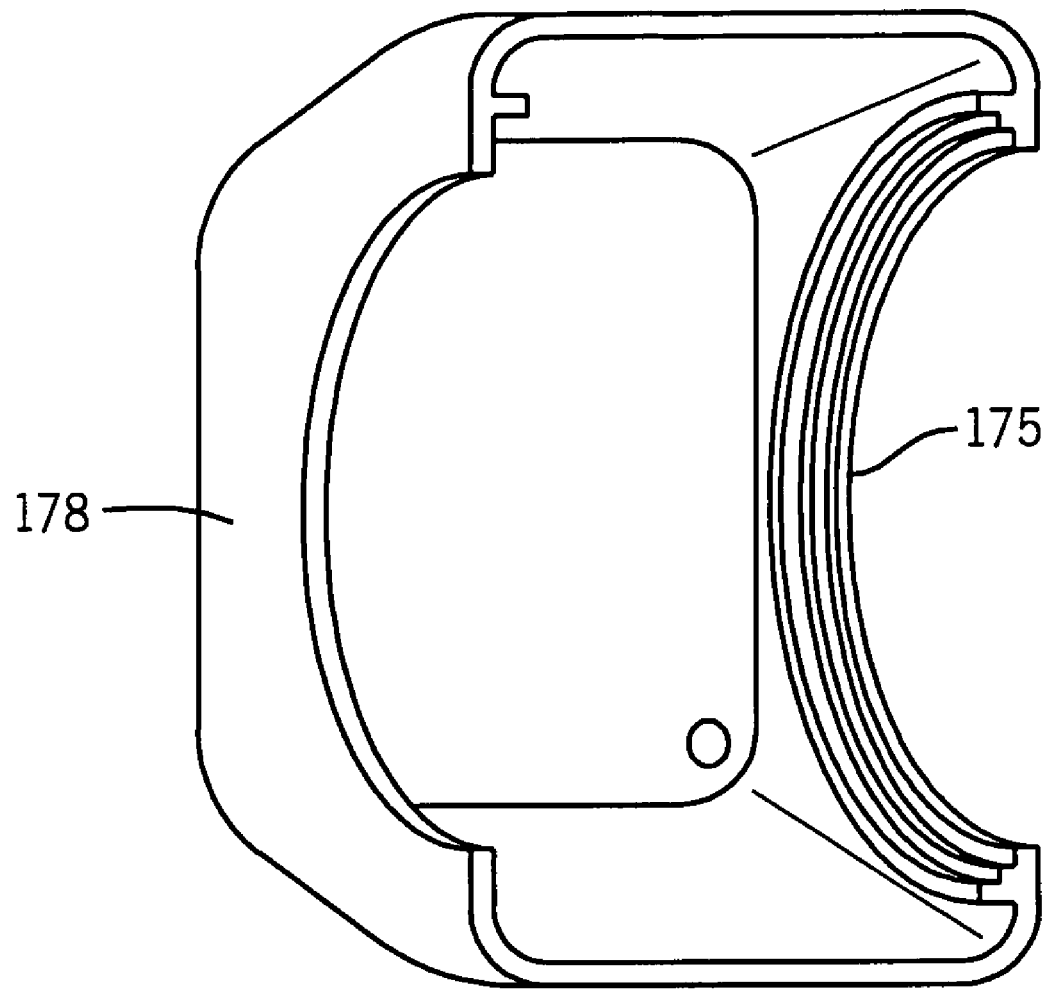
FIG. 13 is a perspective view of a sensor cover.

In one embodiment shown in FIGS. 12A, 12B, and 13, a cover 173 is provided for engaging the mounting frame 168. An aperture 174 through the cover 173 may be provided to allow passage of wires (not shown) into and out of the actuation device 100. The cover 173 may comprise two halves, a sensor cover portion 175 and a back cover portion 176. The sensor cover portion 175 is adapted to allow sensor 190 to operate therethrough, such as through a sensor window 178. The back cover portion 176 may include the aperture 174 which may engage a wiring tube 179.

Figure 9A:
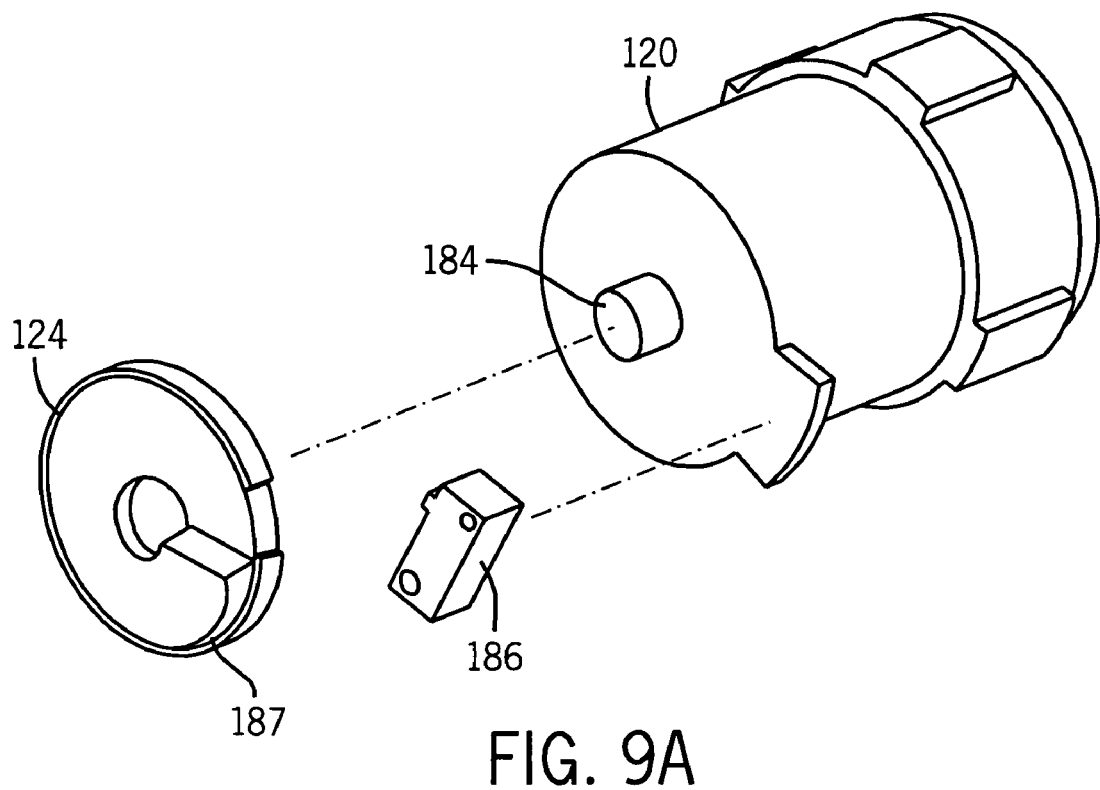
FIG. 9A is a perspective view of a drive housing and an unattached drive cam and limit switch.
Figure 9B:
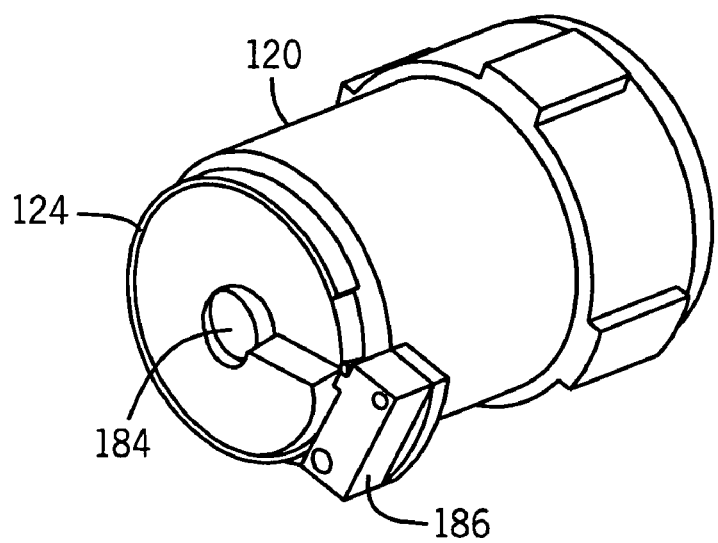
FIG. 9B illustrates the components of FIG. 9A attached.
Figure 15:
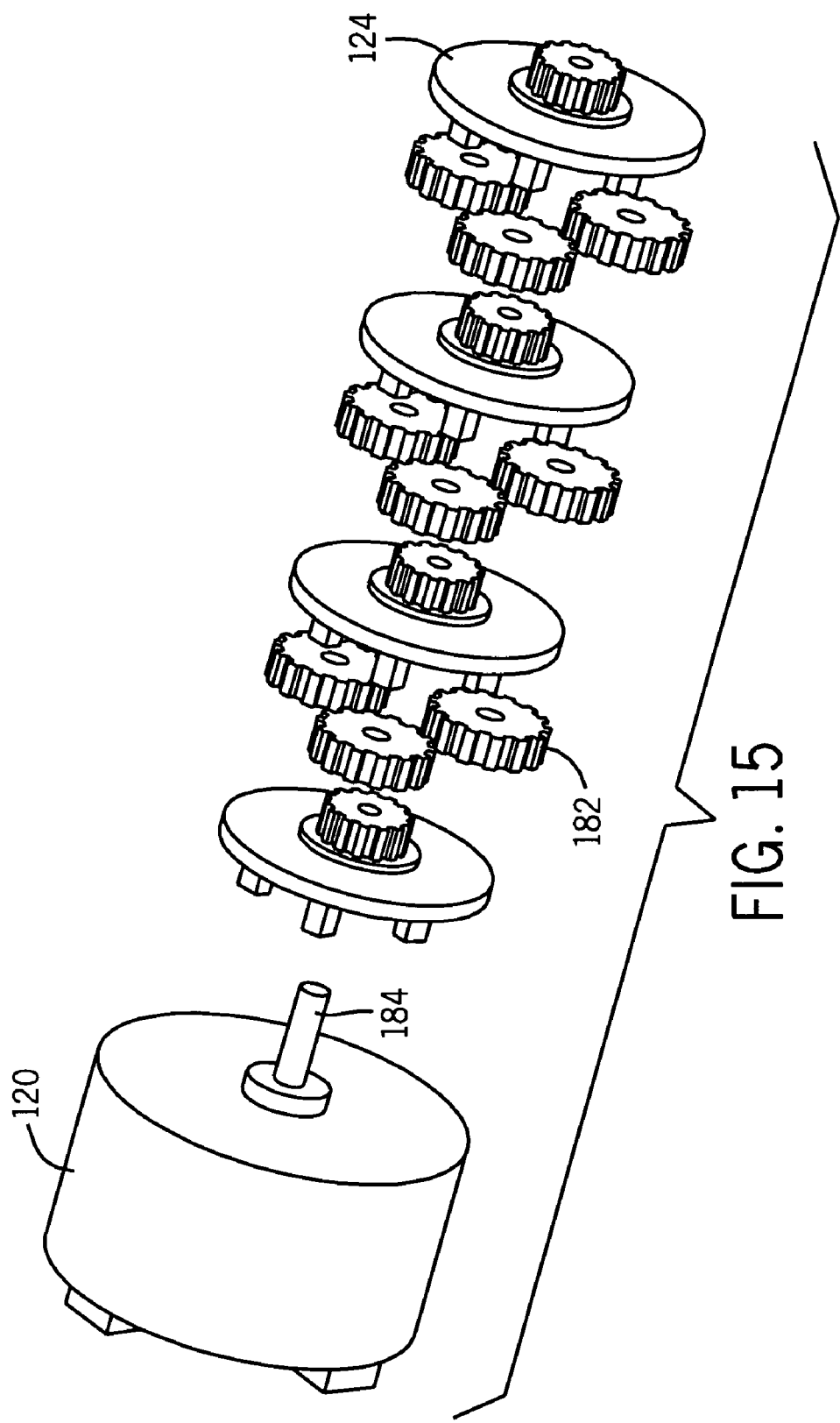
FIG. 15 is a perspective view of a gear set of one exemplary embodiment of the present invention.

The motor 120 includes a gear set 182, for example a planetary gear set as shown in FIG. 15, which drives a drive shaft 122. As best shown in FIGS. 9A and 9B, the drive cam 124 is positioned an the output shaft 184. The drive cam 124 is adapted to rotate as the output shaft 184 rotates. In an exemplary embodiment illustrated in FIGS. 9A and 9B, a limit switch 186 provides feedback to the motor 120 regarding the position of the drive cam 124. For example, the drive cam 124 may be provided with a lobe 187 which is engagable with the limit switch 186 such that the motor 120 is turned off when the drive cam 124 has rotated a predetermined amount, such as when a complete revolution has been made.

The sensor 190 is adapted to detect the presence or absence of a user. One of ordinary skill in the art would appreciate that a wide variety of sensor types could be utilized in accordance with the principles of the present invention. For example, the sensor 190 may include, but is not limited to: active infra-red, capacitance detection, passive optical detection (e.g., a photo cell), thermal detection such as passive infrared or thermopiles. The sensor 190 has a zone of detection in which it is capable of detecting one or more stimuli. In one embodiment, the sensor 190 is a passive infrared (PIR) detector. Generally, in order to detect a human being, PIR detectors must be sensitive to the temperature of a human body. Humans, having a skin temperature of about 93 degrees F., radiate infrared energy with a wavelength between 9 and 10 micrometers. In an exemplary embodiment, the sensor 190 is sensitive to infrared energy having wavelengths in the range of about 8 to about 12 micrometers.

Figure 14:
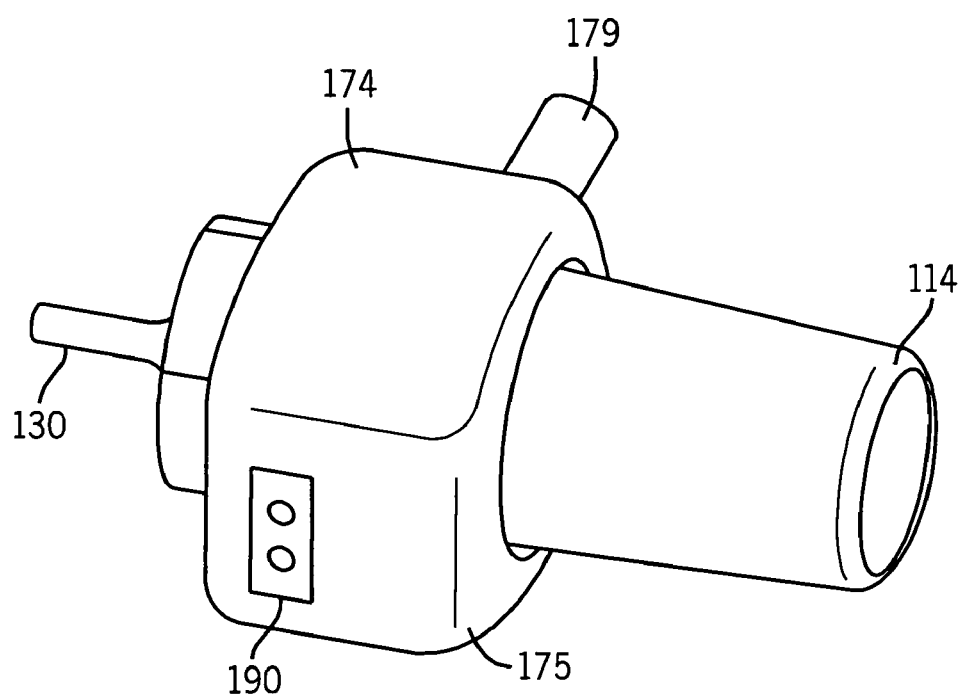
FIG. 14 is a perspective view of a device of the present invention having a sensor cover.

In one embodiment, the zone of detection is not fixed in relation to the flush valve 12, but can be adjusted by moving the sensor 190. For example, the sensor 190 may be positioned remote from the housing 110 and include a wireless communication device for communicating with a wireless communication device associated with the motor 120. In an exemplary embodiment, the sensor (shown in FIG. 14) comprises a radio frequency ("RF") transmitter with the housing 110, including a corresponding RF receiver associated with the motor 120. The sensor 190 transmits an RF signal when the sensor 190 detects a stimulus. The communication device may be transceivers (transmitter and receiver) or the sensor 190 may comprise a transmitter and the housing 110 includes a receiver.

In an exemplary embodiment, the present invention contemplates the use of multiple RF communication devices. In one embodiment, each RF transmission is encoded with a digital ID tag or bit. The receivers) within RF range listen to the RF communication, but unless the ID is correct, no action will be taken. In another embodiment, the communication devices use the same frequency transmissions, wherein only matched frequency paired units will respond to one another.

In one embodiment illustrated in FIGS. 1 and 2, a device of the present invention is mountable to the side of the flush valve 12. The coupling nut 162 is engagable, such as threadably engagable, to the flush valve 12 (FIG. 2).

The flush valve 12 in operative communication with the device of the present invention may be either automatically or manually actuated. FIGS. 2 and 16 illustrate one example device. The rear housing 114 is positioned in the mounting frame 164, as shown in FIG. 11, with sufficient play that it is tiltable in relation to the front housing 112. Tilting of the rear housing 114 results in the drive cam 124 tilting in relation to the plunger cam 136. This results in a portion of the drive cam 124 displacing the plunger cam 136 such that the plunger 36 is driven to slide along its major axis to actuate the flush valve 12. Thus, manual activation resembles the standard motion a user exhibits actuation a flush valve 12, with the rear housing 114 acting as the manual actuation handle 26 and the drive cam 124 acting as the handle face plate 27, providing an intuitive means for manually actuating a urinal or water closet that also has automatic flushing ability.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A dual function flush device comprising:
    a housing comprising a front portion and a rear portion, the rear portion tiltable in relation to the front portion;
    the rear portion of the housing having a motor unit with a rotating shaft, the rotating shaft further having a drive cam at a front end proximate the front portion of the housing;
    the front portion of the housing including a plunger having a first end and a second end with a face plate therebetween, the front portion of the housing further including a plunger bushing with the plunger slidably disposed therein, the plunger bushing engagable with a plunger chamber housing to form a plunger face plate chamber with the faceplate of the plunger disposed therein, the plunger extending through the plunger bushing such that the first end is adjacent the plunger bushing and the plunger further extending slidably through the plunger chamber housing such that the second is adjacent thereto;
    a plunger cam positioned at the second end of the plunger;
    the drive cam in operative communication with the shaft of the motor and engagable with the plunger cam such that rotation of the shaft rotates the drive cam which interacts with the plunger cam, moving the plunger along its longitudinal axis; and
    a non-contact sensor unit, in operative communication with the motor unit, at least partially disposed within the housing, the non-contact sensor positioned to detect user status;
    wherein actuation of the motor by the non-contact sensor or relative tilting of the rear portion of the housing in relation to the front portion of the housing engages the drive cam against the plunger cam, driving the plunger along its longitudinal axis.

2. The dual function flush device of claim 1, further comprising an indicator which provides an indication of the detection status of the device.

3. The dual function flush device of claim 1, further comprising a plunger compression spring to bias the plunger toward the rear portion of the housing, the plunger compression spring positioned between the plunger face plate and the plunger bushing.

4. The dual function flush device of claim 1 wherein the motor unit comprises a set of planetary gears.

5. The dual function flush device of claim 1, wherein the sensor unit comprises a sensor selected from the group consisting of active infra-red sensor, capacitance detection sensor, passive optical detection sensor, thermal detection sensor, or combinations thereof.

6. The dual function flush device of claim 1, wherein one revolution of the drive cam correlates to a complete cycle such that the plunger is extended and returned to its original position.

7. The dual function flush device of claim 1 further comprising a coupling ring coupling the plunger bushing and plunger chamber housing to the motor with the drive cam and the plunger cam disposed therebetween, wherein the plunger is slidable relative to the plunger bushing and motor.

8. The dual function flush device of claim 1, wherein the front portion of the housing comprises a back cover and a front cover, the front cover having an input window for the sensor.

9. The dual function flush device of claim 1, wherein the housing includes an aperture for passage of wiring.

10. An actuator for actuating a relief stem in a flush valve, comprising:
a housing engagable with the flush valve, the housing comprising a front housing and a rear housing, the rear portion tiltable in relation to the front portion;
a motor unit having a rotating shaft and being disposed within rear housing and having a drive cam at a front end proximate the front housing;
a plunger positioned partially in the front housing and having a first end extending from the front of the front housing into the flush valve and engageable with the relief valve stem;
a plunger bushing attached to a plunger chamber housing and forming a chamber therebetween with the faceplate disposed in the chamber;
the second end of the plunger slidably extending through the plunger chamber housing and extending away from the plunger chamber housing towards the rear housing, the second end having a plunger cam disposed thereon proximate the rear housing;
the drive cam in operative communication with the shaft of the motor and engagable with the plunger cam such that rotation of the shaft rotates the drive cam which interacts with the plunger cam, moving the plunger along its longitudinal axis; and
a non-contact sensor unit, in operative communication with the motor unit, at least partially disposed within the housing, the non-contact sensor positioned to detect user status;
wherein the plunger is extendable from the front housing upon rotation of the drive cam against the plunger cam via action of the motor unit or upon titling tilting of the drive cam, as part of the rear housing, against the plunger cam.

11. The dual function flush device of claim 10, further comprising a plunger compression spring to bias the plunger toward the rear portion of the housing.

12. The dual function flush device of claim 10, wherein one revolution of the drive cam correlates to a complete cycle such that the plunger is extended and returned to its original position during the cycle allowing for actuation of a flush valve.

13. The dual function flush device of claim 10 further comprising a coupling ring slidably connecting the plunger to the motor with the drive cam and plunger cam disposed therebetween.

14. The dual function flush device of claim 10, wherein the front housing comprises a back cover and a front cover, the front cover having a input window for the sensor.

15. A side mountable flush valve actuator comprising:
a housing engagable with a side portion of the flush valve, the housing comprising a front portion and a rear portion, the rear portion tiltable in relation to the front portion;
a motor unit having a rotating shaft and being disposed within rear housing and having a drive cam at a front end;
a plunger positioned substantially in the front housing and having a first end extending from the front of the front housing and engagable with the flush valve through apertures in the flush valve and the housing and a second end extending towards the rear housing, the second end comprising a plunger cam;
the drive cam in operative communication with the shaft of the motor and engagable with the plunger cam such that rotation of the shaft rotates the drive cam which interacts with the plunger cam, moving the plunger along its major axis; and
a non-contact sensor unit, in operative communication with the motor unit, at least partially disposed within the housing, the non-contact sensor positioned to detect user status;
wherein the plunger is extendable from the front housing upon rotation of the drive cam against the plunger cam via action of the motor unit or upon titling tilting of the drive cam, as part of the rear housing, against the plunger cam.

16. The device of claim 15, further comprising an indicator which provides an indication of the detection status of the device.

17. The device of claim 15, further comprising a plunger compression spring to bias the plunger toward the rear portion of the housing.

18. The device of claim 15, wherein the sensor unit comprises a sensor selected from the group consisting of active infra-red sensor, capacitance detection sensor, passive optical detection sensor, thermal detection sensor, or combinations thereof.

19. The device of claim 15 further comprising a coupling ring slidably connecting the plunger to the motor with the drive cam and plunger cam disposed therebetween.

20. The device of claim 15, wherein the front housing comprises a back cover and a front cover, the front cover having an input window for the sensor.

* * * * *